United States Patent [19]

Brown

[11] Patent Number: 5,185,182

[45] Date of Patent: Feb. 9, 1993

[54] METHOD FOR INHIBITING SIGNIFICANT OXIDATION OF A FILM ON A SUBSTANCE DURING HEATING

[75] Inventor: Franklin I. Brown, Detroit, Mich.

[73] Assignee: Ford Motor Company, Dearborn, Mich.

[21] Appl. No.: 624,823

[22] Filed: Dec. 10, 1990

[51] Int. Cl.⁵ ........................ B05D 5/12; C03C 17/23
[52] U.S. Cl. .............................. 427/126.2; 427/126.3; 427/165; 427/166; 427/255; 65/32.1; 65/107
[58] Field of Search ................ 427/377, 383.1, 383.3, 427/383.5, 126.1, 162, 164, 165, 166; 65/107, 32.1

[56] References Cited

U.S. PATENT DOCUMENTS

| 3,510,284 | 5/1970 | McMaster et al. | 65/25 |
| 3,879,108 | 4/1975 | Berets | 350/160 R |
| 3,914,514 | 10/1975 | MacKenzie et al. | 428/426 |
| 3,978,007 | 8/1976 | Giglia et al. | 252/506 |
| 4,233,339 | 11/1980 | Leibowitz et al. | 427/108 |
| 4,661,381 | 4/1987 | Callies et al. | 427/255 |
| 4,749,594 | 6/1988 | Malikowski et al. | 427/190 |
| 4,960,324 | 10/1990 | Brown | 350/357 |

Primary Examiner—Michael Lusignan
Assistant Examiner—Bret Chen
Attorney, Agent, or Firm—Charles H. Ellerbrock; Roger L. May

[57] ABSTRACT

The present invention relates to a method for inhibiting significant oxidation of a film on a substrate during heating of the substrate. The method includes providing a metal or metal oxide film on a substrate and providing a material adjacent to the film. The substrate is then heated to a temperature sufficient to cause the substrate to bend and the material adjacent to the film reacts in such a way as to protect the metal or metal oxide film on the substrate from further significantly oxidizing.

15 Claims, 1 Drawing Sheet

METHOD FOR INHIBITING SIGNIFICANT OXIDATION OF A FILM ON A SUBSTANCE DURING HEATING

BACKGROUND OF THE INVENTION

1. Field of the Invention

The present invention relates to a method for inhibiting significant oxidation of a film on a substrate. According to one embodiment, this invention relates to a method of inhibiting significant oxidation of films of electrochromic materials comprising a non-stoichiometric, oxygen deficient metal oxide film provided by pyrolytic deposition techniques wherein the non-stoichiometry of the metal oxide film on the glass is maintained during heating and bending of the glass.

2. Discussion of the Related Art

Electrochromic devices are devices in which a physical/chemical change produced in response to the induced electrical field results in a change in the reflective (or transmissive properties) of the device with respect to electromagnetic radiations, e.g., UV, IR and visible radiation. Such devices generally comprise a film of electrochromic material. The electrochromic film usually comprises an inorganic metal oxide most commonly a transition metal oxide, in particular, tungsten oxide film; more particularly non-stoichiometric tungsten oxide film provided according to the teachings of U.S. Pat. No. 4,960,324, assigned to Ford Motor Company.

One of the problems solved by the teachings in U.S. Pat. No. 4,960,324 is that it teaches a method which is suitable for coating large areas such as would be necessary if, e.g., sunroofs or windshields of automobiles were to be made as electrochromic devices. It also teaches a sequential process suitable for providing multiple layers of the various films required for an electrochromic device. As would be apparent, it would be advantageous to make sunroofs or windshields electrochromic devices which could be colored to desired intensity to keep out radiation like UV, IR and visible transmissions at will. For example, it might be desirable to "color" the sunroof and the windows to allow minimum transmittance when the automobile is parked to prevent the interior of the automobile from heating up on a sunny day. In another embodiment, the windshield might be colored to an intensity which allows operation of the automobile yet reduces the amount of visible, UV, and IR transmission through the windshield.

Non-stoichiometric, oxygen deficient tungsten oxide films have been observed to show excellent electrochromism. Electrochromism is also known to occur in several transition metal oxides. The characteristics of electrochromism are manifested by a reversible color change, usually switching from an uncolored state to a colored state, or vice versa, as a result of an applied electric current. From a building energy efficiency viewpoint in regards to using electrochromic glazings, the ability to dynamically control incoming solar radiation either in the visible or near infrared spectral regions is very attractive. Electrochromism also has an important future in automotive glazings. The properties of certain non-stoichiometric metal oxide films, more particularly non-stoichiometric, oxygen deficient tungsten oxide film is very important to the development of large area optical shutters which may be used as information displays or as windows for motor vehicles.

However, the glass which serves as a support for such electrochromic non-stoichiometric metal oxide films is usually subjected to a bending process to bend the glass part to conform with the shape and form of automotive glazing. In the event that the non-stoichiometric, oxygen deficient metal oxide film is to be provided on the glass support prior to bending, the subsequent bending of the glass/metal oxide film system leads to a diminished electrochromic character of the non-stoichiometric oxygen deficient metal oxide film. It is believed that since the bending process is normally performed in air at temperatures of about 1200° F., the diminished electrochromic character of the non-stoichiometric metal oxide film is caused by the oxidation of a non-stoichiometric metal oxide film before bending, to a stoichiometric metal oxide film after bending the glass support. Present methods for providing the electrochromic layer are incapable of providing a non-stoichiometric metal oxide layer which can then be subjected to the bending and fabrication processes required to transform the non-stoichiometric metal oxide layer on glass to the required shapes and sizes for sunroofs or windshields without structurally changing the layer.

Another problem encountered with the electrochromic non-stoichiometric metal oxide layer is that when the layer is subjected to glass bending processes which comprise heating and bending, the layer becomes stoichiometric because of oxidation and therefore the layer loses its electrochromic efficiency. This is particularly problematic if the metal oxide layer is to be used in a device that requires many cycles to keep out undesirable radiation, as would be intended by a sunroof or windshield of an automotive vehicle or a window of a building.

Still another problem of such metal oxide layers is the introduction of micro cracks in the layer due to film stress when the layer oxidizes from a non-stoichiometric metal oxide layer to a stoichiometric metal oxide layer during the bending and fabrication process. These micro cracks in the metal oxide layer are undesirable because they are partly responsible for degradation of the layer.

It is desirable to have a method which could maintain the sub-stoichiometry of the electrochromic metal oxide film on glass during bending of the glass. This would help guarantee that such a metal oxide layer, when used in an electrochromic device, is capable of switching for a prolonged period of time without significantly changing its electrochromic activity. It would also be advantageous if the method for maintaining the electrochromic metal oxide sub-stoichiometry would be simple and commercially suitable for applying to large areas easily.

SUMMARY OF THE INVENTION

The invention disclosed herein is capable of overcoming the above mentioned problems of prior art electrochromic layers. The present invention is directed toward a method of inhibiting significant oxidation of a film on a substrate. One embodiment of the present invention includes a method of inhibiting significant oxidation of a non-stoichiometric metal oxide film on glass during heating and bending of the glass. This method comprises bending a "matching pair" of glass/film substrates with powdered material by, placing the "matching pair" on a bending fixture, and introducing the "matching pair" on the bending fixture into a bending lehr via a conveyer. The glass/film substrates comprise a pair of glass substrates and preferably therebetween: one electrode layer, a metal or metal oxide layer, powder material, a counter electrode layer and another electrode layer, in that order, wherein the metal or metal oxide layer preferably comprises a non-stoichiometric, oxygen deficient, variable oxidation state metal oxide film. Thus, when the pair of glass sheets is subjected to the bending process, the powdered material is capable of producing reducing or neutral gases between the matching pair of glass sheets to prevent the oxidation of the film during the bending process.

The powdered materials are compounds which can be selected from groups that are capable of producing reducing or neutral gases during decomposition. The glass that requires bending is placed on a bending fixture, fabricated to allow the glass to bend to a predetermined shape. The bending fixture with the glass is introduced into the horizontal furnace at such a conveyer speed so as to allow the glass to heat up to its softening point, and then bend (sag) due to gravity on the bending fixture, until it assumes its predetermined shape. The bending lehr is essentially a horizontal furnace with temperatures ranging from 72° F. to 1200° F. and having a conveyer with variable speed ranging from 2 in./min. to 500 in./min. The glass having a film substrate is introduced into the bending lehr using the bending fixture and is conveyed on the bending fixture by the conveyer through the bending lehr.

It has been found that preferred embodiments of the present invention are capable of substantially preventing oxidation of the non-stoichiometric, oxygen deficient, variable oxidation state metal oxide. Additionally, the method of the present invention provides films which remain durable after bending of the glass substrates. It has also been found that when the method of the present invention was applied to the non-stoichiometric, oxygen deficient films, the films maintained their electrochromic character.

DETAILED DESCRIPTION OF THE PREFERRED EMBODIMENTS

Figure 1:
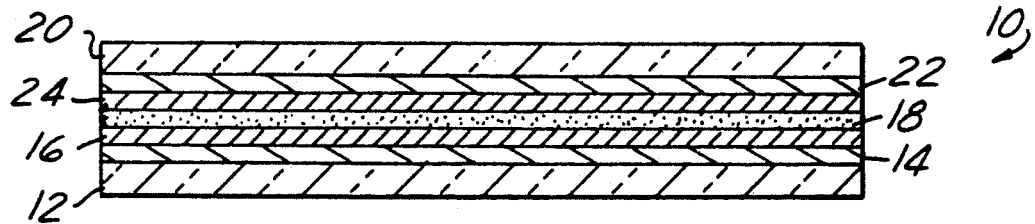
FIG. 1 is a cross sectional view of an arrangement for forming a matching pair of glass substrates having films thereon according to the present invention.

FIG. 1 illustrates an overall view of a pair of glass substrates having films deposited thereon and powdered material included therebetween prior to any heating and/or bending of the glass substrates. This arrangement is generally identified by reference numeral 10. This arrangement 10 includes a glass substrate 12 shown in FIG. 2 with a transparent electrode film 14 pyrolytically deposited thereon. It is also possible to deposit this film by chemical vapor deposition or other known methods well known to one of ordinary skill in the art. Pyrolytically deposited on top of transparent electrode 14 is an electrochromic layer preferably a non-stoichiometric metal oxide film such as tungsten oxide. This metal oxide film is generally indicated by reference numeral 16.

Figure 3:
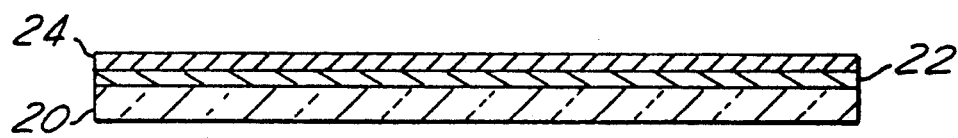
FIG. 3 shows in cross-sectional view of the second half of the arrangement shown in FIG. 1 wherein the glass substrate includes the respective films thereon.

FIG. 3 discloses the other half of the arrangement 10 wherein the glass substrate 20 includes a transparent electrode 22 deposited pyrolytically or by chemical vapor deposition as described above. Electrode 22 can further include an optional counter electrode layer 24 which can be deposited pyrolytically or by other well known means.

Figure 2:
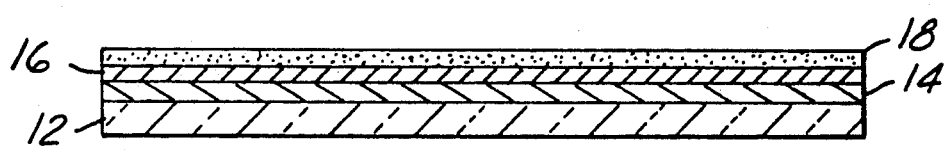
FIG. 2 is a cross-sectional view of the first half of the arrangement shown in FIG. 1 showing one glass substrate and the associated films thereon with the protectant material adjacent to the film.

A material 18 is then applied to either the metal oxide film 16, as shown in FIG. 2, or to the counter electrode 24. If there is no counter electrode 24, the material 18 can be applied to electrode 22. This material 18 is preferably in the form of a powder and it is applied to the surface of the film such that when the arrangement is assembled, the powdered material 18 will be adjacent to the metal oxide film 16.

The transparent electrodes layers 14 and 22 are individually selected from electrode materials consisting essentially of doped or undoped (a) tin oxide, (b) indium oxide, (C) indium tin oxide, (d) zinc oxide, and (e) mixtures of any of them.

The electrochromic non-stoichiometric metal oxide film 16 can be selected from tungsten oxide, molybdenum oxide, copper oxide, nickel oxide, cobalt oxide and mixtures of any of them. The optional counter-electrode layer 24 is selected from vanadium oxide, titanium oxide, copper oxide, niobium oxide and mixtures of any of them.

The powdered material 18 is selected so that when the arrangement 10 is heated, the powdered material is capable of producing reducing or inert/neutral gases adjacent to the metal oxide film 16 thereby inhibiting significant oxidation of the metal oxide film on the substrate. Exemplary of powdered materials capable of producing reducing or neutral gases include carbonyl, carbonates, hydrides, formate, borohydrides, sulfates, sulfites, ammonia compounds and hydrazine. Reducing elements such as W, V, Cu, Fe, Pb etc. may also be included in the composition. It is not necessary that the material 18 necessarily be a powdered material. It is also contemplated that the material may be a liquid including a gel formulation of materials outlined above as long as the material produces a reducing or neutral gas adjacent to the metal oxide film substantially inhibiting significant oxidation of the film.

In another embodiment, it is also contemplated that material 18 need not be adjacent the film. In such a case one would provide a gaseous environment adjacent the metal oxide film during heating and bending of the glass substrates and this gas would be capable of providing a reducing or neutral environment adjacent the film during the heating of the substrate. The gases employed according to this invention include inert gases or reducing gases including, but not limited to gases such as nitrogen, argon and hydrogen and other gas mixtures of the like. Other gas mixtures could also be utilized and those gases would be selected from those well known in the art. The optimal amount of inert or reducing gas or reducing agent which could be employed according to this invention is that which would inhibit significant oxidation of the film during heating. Selection of optimal amounts of such material (e.g., inert gas and/or reducing agents) will be apparent to those skilled in the art in view of the present disclosure.

Figure 4:
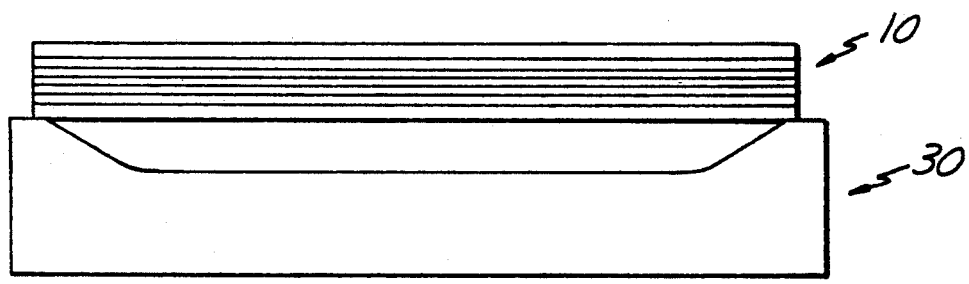
FIG. 4 illustrates the arrangement of FIG. 1 placed on a bending fixture prior to the heating and bending operation.
Figure 5:
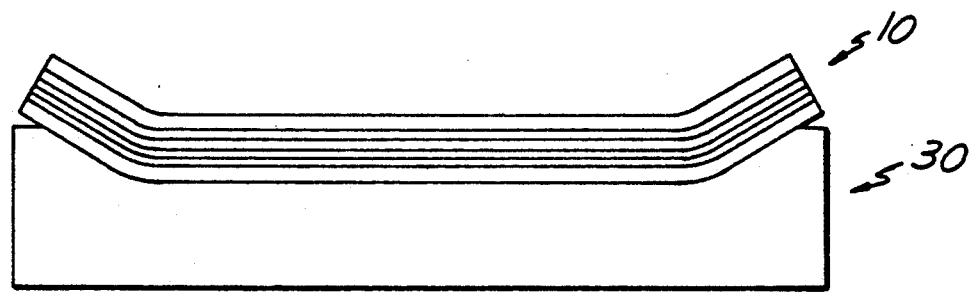
FIG. 5 illustrates the matching pair arrangement formed following the bending operation.

FIG. 4 discloses the arrangement 10 disposed on a bending fixture 30 which can be placed on a conveyor which leads into a horizontal lehr wherein the arrangement 10 is heated to temperatures of about 1200° F. At this temperature, the glass substrates which have been placed horizontally, begin to bend via gravity and conform to the exact shape of the bending fixture as shown in FIG. 5.

If a powdered material or other material 18 is used adjacent to the metal oxide film, this material must produce a reducing gas or inert atmosphere adjacent to the film thereby inhibiting significant oxidation of the film during the heating and bending process. In the preferred embodiment of the invention the powdered material will sublime to produce the gaseous environment adjacent to the metal oxide film and thereby protect it from significant oxidation.

Following the bending process the arrangement 10 is removed from the bending fixture 30 and the two glass substrates 12, 20, are separated and any residual powder or reactant material is cleaned from the surface of the metal oxide film 16 or other exposed surfaces.

The substrates 12 and 20 have now been bent into a substantially identical shape such that they are termed a "matching pair" in the art and this matching pair can then be assembled into an electrochromic device with the addition of an ion conductive material therebetween and any sealing of the edges which may be needed.

While the preferred embodiment has been described in conjunction with forming the matching pair of two substrates 12 and 20 with the respective films thereon, this invention also contemplates that this process can be applicable to only one substrate 12 with a respective film or films thereon. The invention also contemplates that the film can have a metal or metal oxide as the outermost coating wherein this coating has the opportunity of oxidizing when the substrate is heated. In this case, it is possible to apply the material 18 to the metal or metal oxide film 16 such as is shown in FIG. 2 and then place this substrate with its respective films onto the bending fixture 30 and commence the bending process. As described earlier, it is also possible to omit the material 18 adjacent to the metal or metal oxide film and provide an inert atmosphere adjacent to the metal or metal oxide film to inhibit significant oxidation of the film.

While the preferred embodiment has also been described in conjunction with non-stoichiometric metal oxide film such as $WO_{3-x}$, it is also contemplated that this invention is useful for preventing or inhibiting significant oxidation of a metal oxide film which is stoichiometric and has the possibility of further oxidation. One example contemplated by this invention is the oxidation of the film of vanadium oxide ($VO_2$) into the further oxidized state $V_2O_5$. Other such metal oxide films which can be further oxidized into other stoichiometric arrangements are also contemplated and are well known to those skilled in the art.

It is also contemplated that this invention is useful for preventing or inhibiting significant oxidation of a metal film that has the possibility of oxidation upon heating. For example, an Al film when heated may oxidize to $AlO_2$ which can be undesirable. Therefore, the material 18 can be added to this Al film prior to heating to protect the film from significant oxidation. Other metals contemplated by the present invention include Al, Ag, Cu, Ta, Zr, Mo, Zr, Mo, Zn, Sn, Ti, Cr, In, W, Mg, Ni, Fe and mixtures of any of them. As described herein, silicon is considered a metal within the context of this application.

While the present invention has been described in conjunction with a non-stoichiometric metal oxide film usable in an electrochromic device, other films are also capable of being applied to the substrates such as other electrochromic layers, etc.

The invention will be further understood by referring to the following detailed examples which exemplify embodiments of the present invention. It should be understood that the specific examples are presented by way of illustration and not by way of limitation.

EXAMPLE 1

An electrochromic device was made of a first 58 cm² glass substrate which had pyrolytically deposited thereon a transparent electrode made of fluorine-doped tin oxide film and applied thereto was a non-stoichiometric oxygen deficient tungsten oxide ($WO_{3-x}$) film having a thickness of 270 nm. A second 58 cm² substrate had a fluorine-doped tin oxide transparent electrode pyrolytically deposited thereon and these two substrates were then spaced parallel to each other and the edges were sealed with a silicon resin to form a cavity between the transparent electrode of the second substrate and the non-stoichiometric tungsten oxide film of the first substrate. An electrolytic solution comprising one molar lithium perchlorate in propylene carbonate was injected into the cavity to provide an ion conductor therefor. This then completed the electrochromic device. There was no bending or heating of the substrates containing the films in this example.

The visible light transmission of the device in the "bleached" (uncolored) state was measured by a transmittance meter. The results are shown in Table 1. A copper wire was connected to each electrode. A direct biasing voltage of 3 V was applied for 5 minutes across the electrode with the electrode nearest the $WO_{3-x}$ film being of negative polarity. Application of this voltage caused the electrochromic non-stoichiometric tungsten oxide ($WO_{3-x}$) film in the device to change from colorless to a blue color (colored state). The light transmission of the device in the colored state was also measured by a transmittance meter. This result is also shown in Table 1.

EXAMPLE 2

A matching pair of glass substrates was prepared for bending which included a first glass substrate of 58 cm² having a pyrolytically deposited fluorine-doped tin oxide film and a pyrolytically deposited non-stoichiometric tungsten oxide film having a thickness of 270 nm. The other glass substrate of 58 cm² included a fluorine-doped tin oxide film electrode which was pyrolytically deposited thereon. These substrates were then placed together such that the non-stoichiometric tungsten oxide film contacted the film of the other substrate. No powder material was added to this combination. This device was then placed in a bending fixture and was subjected to a bending process which included placing it on a conveyor which fed the device through the horizontal lehr having a temperature of 1200° F. At this point the substrates conformed to the shape of the fixture and the bent arrangement was then removed from the horizontal lehr. The two substrates with the included films were then separated and assembled into an electrochromic device including the electrolytic solution disclosed above in Example 1.

The same procedure for measuring the light transmittance described in Example 1 was then utilized and the electrochromic device was measured in the bleached and the colored states. Table 1 lists the results including a greatly increased transmission for the colored state. This higher transmission value is believed to represent the diminished electrochromic character of the tungsten oxide film. It is believed that the non-stoichiometric tungsten oxide film was allowed to oxidize into a stoichiometric $WO_3$ film after bending.

EXAMPLE 3

In this example, the two substrates were prepared as an Example 2, however, after the non-stoichiometric film was applied to the first substrate, a powdered material of $CaCO_3$ was applied to the tungsten oxide film. The other substrate was then added on top of this such that its electrode contacted the $CaCO_3$ powder. This sandwich was then placed on a bending apparatus and heated as described in Example 2. Following bending, the sandwich was separated and then assembled into an electrochromic device by adding an electrolytic solution described in Example 1.

The transmission measurements were then obtained as described in Example 1 for the bleached and colored states and the results are set forth in Table 1. When the results of the Example 3 are compared to that of Example 2, it is seen that the inclusion of $CaCO_3$ as a powdered material, provided a means capable of preventing or inhibiting significantly the oxidation of the non-stoichiometric tungsten oxide on the glass during bending of the glass.

EXAMPLE 4

This sample was prepared as set forth in the description outlined in Example 3, however, herein the powdered material which was adjacent to the non-stoichiometric tungsten oxide film was 75% $CaCO_3$ and 25% $W(CO)_6$.

The transmission measurements were taken after the device had been assembled following the bending processing outlined above. These transmission results are set forth in Table 1.

EXAMPLE 5

This sample was prepared as set forth in the description outlined in Example 3, however, herein the powdered material which was adjacent to the non-stoichiometric tungsten oxide film was 50% $CaCO_3$ and 50% $W(CO)_6$.

The transmission measurements were taken after the device had been assembled following the bending processing outlined above. These transmission results are set forth in Table 1.

EXAMPLE 6

This sample was prepared as set forth in the description outlined in Example 3, however, herein the powdered material which was adjacent to the non-stoichiometric tungsten oxide film was 25% $CaCO_3$ and 75% $W(CO)_6$.

The transmission measurements were taken after the device had been assembled following the bending processing outlined above. These transmission results are set forth in Table 1.

EXAMPLE 7

This sample was prepared as set forth in the description outlined in Example 3, however, herein the powdered material which was adjacent to the non-stoichiometric tungsten oxide film was $W(CO)_6$.

The transmission measurements were taken after the device had been assembled following the bending processing outlined above. These transmission results are set forth in Table 1.

As can be seen from Table 1, the higher the percentage of $W(CO)_6$ the lower the transmission percentage of the electrochromic device while the device was in the colored state following bending.

TABLE 1

Visible Transmission (%) of non-stoichiometric $WO_x$ film in an electrode cell before and after bending process.
(Applied Voltage: 3V; Time: 3 minutes)

| | | Transmission (%) | | | |
|---|---|---|---|---|---|
| | | Before Bending | | After Bending | |
| Ex. | Powder Used | Bleached | Colored | Bleached | Colored |
| 1 | None | 74.2 | 30.5 | — | — |
| 2. | None | — | — | 76.8 | 43.3 |
| 3. | 100% $CaCO_3$ | — | — | 75.5 | 41.7 |
| 4. | 75% $CaCO_3$ 25% $W(CO)_6$ | — | 76.6 | 40.5 | |
| 5. | 50% $CaCO_3$ 50% $W(CO)_6$ | — | — | 75.5 | 38.4 |
| 6. | 25% $CaCO_3$ 75% $W(CO)_6$ | — | — | 76.0 | 36.1 |
| 7. | 100% $W(CO)_6$ | — | — | 75.8 | 34.1 |

In view of the disclosure, many modifications of this invention will be apparent to those skilled in the art. It is intended that all such modifications fall within the true scope of this invention be included within the terms of the appended claims.

What is claimed is:

1. A process for making an electrochromic device, comprising the steps of:
   A) providing a glass substrate, including an electrochromic layer thereon;
   B) placing a powder on the electrochromic layer, the powder capable of releasing a gas which substantially prevents oxidation of the electrochromic layer upon heating; and
   C) heating and bending the glass substrate and associated electrochromic layer;
   the powder being effective to substantially prevent oxidation of the electrochromic layer.

2. The process for making an electrochromic device according to claim 1, wherein during the step of heating and bending, the powder material releases a gas selected from the group consisting of an inert and a reducing gas adjacent the electrochromic layer.

3. The process for making an electrochromic device according to claim 1, wherein prior to step C, a second substrate including an electrode layer thereon is positioned adjacent the powder material.

4. The process for making an electrochromic device according to claim 1, wherein step C includes heating the substrate to a temperature greater than 1000° F.

5. The process for making an electrochromic device according to claim 1, wherein the powder is selected from the group consisting of carbonyls, carbonates, hydrides, formates, borohydrides, sulfates, sulfites, ammonia compounds, hydrazine compounds, W, Mo, Cu, Ti, Ni, No, Au, Fe, V, and mixtures thereof.

6. The process for making an electrochromic device according to claim 1, wherein the glass substrate includes a conducting layer.

7. The process for making an electrochromic device according to claim 6, wherein the conducting layer is selected from the group consisting of doped tin oxide, undoped tin oxide, indium oxide, indium tin oxide, zinc oxide and mixtures thereof.

8. The process for making an electrochromic device according to claim 1, wherein the electrochromic material is a metal oxide.

9. The process for making an electrochromic device according to claim 8, wherein the metal oxide is a non-stoichiometric metal oxide.

10. The process for making an electrochromic device according to claim 9, wherein the non-stoichiometric metal oxide is selected from the group consisting of non-stoichiometric tungsten oxide, molybdenum oxide, copper oxide, nickel oxide, cobalt oxide and mixtures thereof.

11. The process for making an electrochromic device according to claim 1, wherein the electrochromic layer includes a metal film.

12. The process for making an electrochromic device according to claim 11, wherein the metal film is selected from the group consisting of Al, Ag, Cu, Ta, Zr, Mo, Zn, Sn, Ti, Cr, In, W, Mg, Ni, Fe, Si and mixtures thereof.

13. The process for making an electrochromic device according to claim 5, wherein the powder is selected from the group consisting of calcium carbonate, tungsten hexacarbonyl, and mixtures thereof.

14. A process for making an electrochromic device, comprising the steps of:
A) providing a glass substrate including a conducting layer selected from the group consisting of doped tin oxide, undoped tin oxide, indium oxide, indium tin oxide, zinc oxide, and mixtures thereof, the glass substrate having thereon an electrochromic layer selected from the group consisting of non-stoichiometric tungsten oxide, molybdenium oxide, copper oxide, nickel oxide, cobalt oxide, and mixtures thereof, the electrochromic layer optionally including a metal film selected from the group consisting of Al, Ag, Cu, Ta, Zr, Mo, Zn, Sn, Ti, Cr, In, W, Mg, Ni, Fe, Si, and mixtures thereof;
B) placing a powder selected from the group consisting of carbonyls, carbonates, hydrides, formates, borohydrides, sulfates, sulfites, ammonia compounds, hydrazine compounds, W, Mo, Cu, Ti, Ni, No, Au, Fe, V, and mixtures thereof on the electrochromic layer;
C) positioning a second glass substrate including an electrode layer thereon adjacent the powder; and
D) heating to a temperature greater than 1000° F. and bending the glass substrate and associated electrochromic layer;
the powder being effective to substantially prevent oxidation of the electrochromic layer.

15. The process for making an electrochromic device according to claim 14, wherein the powder is selected from the group consisting of calcium carbonate, tungsten hexacarbonyl, and mixtures thereof.

* * * * *